July 24, 1956

R. LUCIEN 2,756,046

FLUID SPRING GEAR

Filed Dec. 1, 1953

United States Patent Office 2,756,046
Patented July 24, 1956

2,756,046

FLUID SPRING GEAR

René Lucien, Paris, France, assignor to Societe d'Inventions Aeronautiques et Mechaniques S. I. A. M., Fribourg, Switzerland, a societe anonyme of Switzerland Application December 1, 1953, Serial No. 395,577

Claims priority, application France August 10, 1953

3 Claims. (Cl. 267—15)

Generally, such spring gears as are used commonly and notably on automobiles involve a compromise between two main requirements, viz: comfortableness and roadability.

Effectively, on the one hand, comfortableness requires a soft responsivity of the spring gear, which means that the slope of the spring characteristic, i. e. the curve representing the sag of the spring gear as a function of the stresses imposed thereupon, must not be too steep.

On the other hand the consequence of such soft responsivity of the spring gear is that the position of the sprung portion of the vehicle with respect to the ground is not defined precisely and that considerable variations in the trim are experienced consequent to overloading or to centrifugal effects.

My invention aims at obtaining a spring gear capable of ensuring both comfortableness and roadability within a comparatively wide load range. A separate spring gear is provided between each wheel and the load portion assigned thereto. Moreover, at rest on an uneven ground, the sprung portion occupies a well-defined position relative to the ground irrespective of the load.

A spring gear according to my invention is characterized thereby that the vehicle is sprung through the medium of controlled hydraulic jacks, preferably one of them per wheel, each jack being connected on the one hand with a pump, on the other hand with means to accumulate an elastic pressure and being designed to constitute its own valve.

According to a further characteristic of my invention, the connection between each jack and the accumulator is provided with valves adapted to cushion the oscillations.

Figure 1:
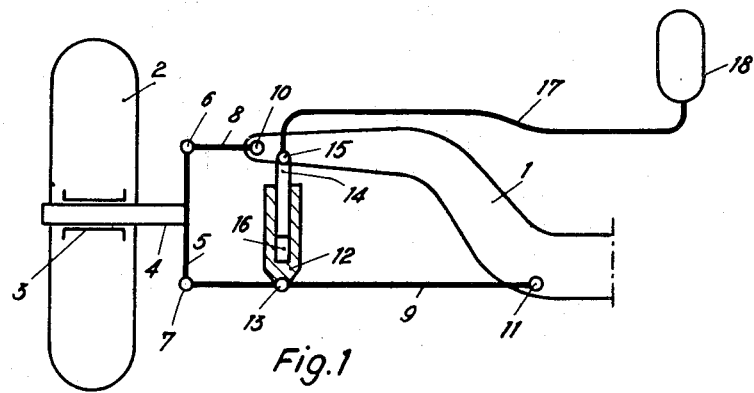

A particular embodiment of my invention will be described hereinafter for the purpose of exemplification and by no means of limitation, reference being had to the appended drawings in which:

Figure 1 diagrammatically shows how an automobile wheel is linked through my spring gear to the related end of a chassis cross beam.

Figure 2:
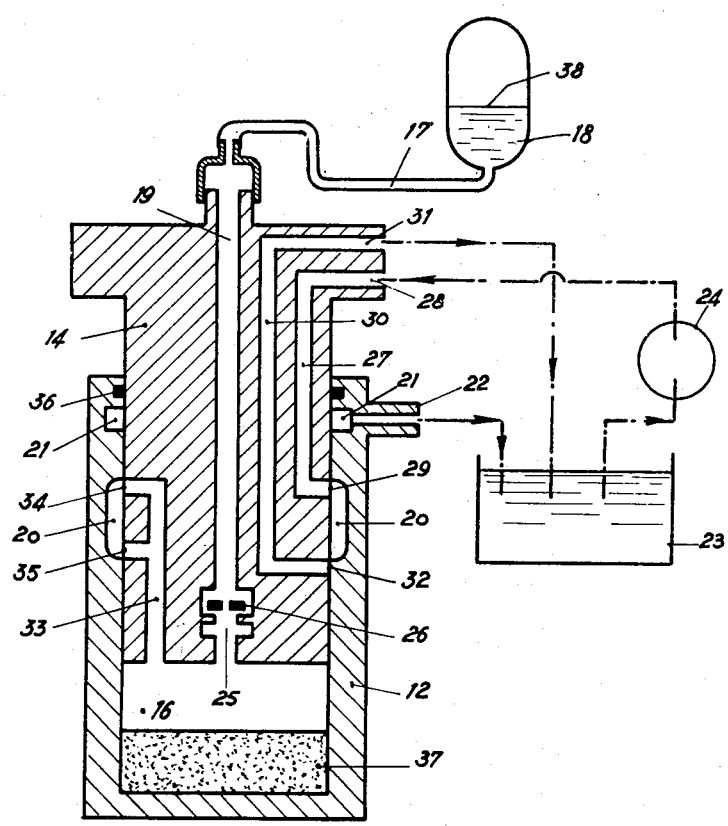

Figure 2 is a diagrammatical partly sectional view of the spring gear according to my invention.

Referring now to Fig. 1 of the drawing, 1 designates the chassis cross beam, 2 the wheel, 3 the bearing of the same and 4 the journal mounted therein. The wheel is linked to the cross beam through a gear which includes a bar 5 rigid with the journal 4 and having its ends 6, 7 connected through links 8, 9 respectively with the cross beam at 10 and 11.

The spring gear according to my invention consists, for each wheel, of a jack the barrel 12 of which is pivoted at 13 to link 9 and has a piston 14 slidably received therein which is pivoted at its outer end 15 to the cross beam 1.

The pressure chamber 16 in the jack communicates through a pipe 17 with an accumulator 18, for which purpose, in the embodiment described, the piston is formed with a longitudinal channel 19 connected with the pipe 17.

Said accumulator may be of any suitable kind; for instance, it may include a spring-loaded piston, or an air vessel, or a membrane; it may also be a liquid filled receptacle containing compressible balls, or delimited by thin extensible walls as contemplated hereinafter.

According to a very important feature of my invention, the barrel 12 and the piston 14 are so designed that the jack constitutes its own valve. To that end, the barrel is formed inside with a pair of annular grooves by which there are defined between the piston and the barrel an annular chamber 20 and, close to the open end of the barrel, a further annular chamber which through a pipe connected at 22 communicates with an oil return tank 23 from which oil can be sucked again by means of an oil pump 24.

The channel 19 in piston 14 includes a valve box 25 in which one or several clack valves 26 are housed. Two further channels are provided in piston 14 in addition to the aforementioned channel 19, viz.: a channel 27 which is connected at 28 with the discharge side of the oil pump 24 and leads at 29 to the outside of the piston, and a channel 30 connected at 31 with the tank 23 and leading likewise to the outside of the piston, yet below the orifice 29 at 32. The distance between the orifices 29 and 32 is such that depending on the position of the piston within the barrel, one of said orifices will be fully open to chamber 20 while the other is fully closed by the barrel wall. However, the orifices 29 and 32 must be sufficiently close to each other to ensure that over part of the piston stroke both of them may partly communicate with chamber 20.

At last, the piston is formed with a longitudinal channel 33 leading to and from the chamber 16 delimited between the bottom of the barrel and the lower end of the piston. As shown in the drawing, said channel 33 communicates through the two orifices 34, 35 with chamber 20. A gasket 36 provides for a fluid-tight joint between the upper end of the barrel and the piston.

The operation of the spring gear is as follows:

It is assumed that the vehicle is standing still and the pump 24 has not yet been started; piston 14 is in its lowermost position within the barrel and rests on a cushion 37. The orifice 32 is closed by the barrel wall. Upon the pump being started, oil is forced through orifice 28, channel 27, orifice 29, chamber 20 and channel 33 to fill chamber 16 while moving piston 14 upwards. Valve 26 is lifted and the oil flows onwards into the accumulator 18 up to a definite level 28 while compressing the air thereabove. During the upward displacement of the piston within the barrel and as soon as the orifice 32 is open to the chamber 20, the latter is set into communication with the oil-return tank 23 through channel 30 and orifice 31, with the result that the oil is flowed back into the tank through the orifices 29 and 32.

Irrespective of the load on the vehicle, there exists a position of piston 14 in which the pressure on the lower face of the same is equal to the force to which it is subjected. Effectively, if the piston should have a tendency to assume an exceedingly high position within the barrel, the pressure intake orifice 29 would close while the liquid in the pressure chamber 16 would flow out through orifice 32 and chamber 20 into the tank and thereby cause the piston to sink.

Such oil leaks as may occur are drained through the annular chamber 21 and led back to the tank which is located at a lower level than the outlet 22. An advantage with such draining of the leak oil is that a constant volume is conferred upon the chamber connected with the tank, with the result that the operation of the piston is attended with no disagreeable noise.

It is to be understood that the spring gear according to my invention may be made as sluggish in action as desired in order to ensure utmost comfortableness together with satisfactory shock absorption, and this, owing to the provision of the valves 26, while roadability is obtained by the fact that irrespective of the load the controlled jacks will at all times bring the sprung portion of the vehicle back to the same position with respect to the ground.

I claim:

1. A spring gear for use on vehicles which includes, interposed between each wheel and the related portion of the load, a hydraulic jack of the barrel-and-piston type, a pump, a tank for said pump, an accumulator for an elastic fluid under a pressure, an annular chamber in the inside of the barrel of the jack; in the piston, a first channel connected to the pump discharge and a second channel connected to the tank, said channels both opening on the lateral surface of the piston at a distance from each other such that, in the mean location of the piston in the barrel, both of said channels are simultaneously communicating with said annular chamber, whereas in the upper and lower locations of the piston, the first channel alone and the second channel alone respectively communicate with said annular chamber; a further channel within the piston through which said annular chamber permanently communicates with the pressure chamber, in the jack, delimited between the lower end of the piston and the bottom of the barrel, and a connecting channel connecting said latter chamber with said accumulator.

2. A spring gear as claimed in claim 1 comprising at least one clack valve in said connecting channel.

3. A spring gear as claimed in claim 2 comprising, in the inside wall of said barrel, a second annular chamber opposite said pressure chamber relatively to said first annular chamber, and connected to said tank.

References Cited in the file of this patent

UNITED STATES PATENTS

| | | |
|---|---|---|
| 1,291,016 | Kellogg | Jan. 14, 1919 |
| 1,768,696 | Laddon | July 1, 1930 |
| 1,974,171 | Bizzarri | Sept. 18, 1934 |
| 2,093,259 | Wightman | Sept. 14, 1937 |
| 2,165,465 | Ehrhardt et al. | July 11, 1939 |
| 2,338,896 | Boulogne et al. | Jan. 11, 1944 |

FOREIGN PATENTS

| | | |
|---|---|---|
| 304,838 | Great Britain | Jan. 31, 1929 |